(12) United States Patent
Miller

(10) Patent No.: US 7,762,495 B2
(45) Date of Patent: Jul. 27, 2010

(54) SOLAR POWERED AERIAL VEHICLE

(75) Inventor: Gerald D Miller, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 107 days.

(21) Appl. No.: 11/828,103

(22) Filed: Jul. 25, 2007

(65) Prior Publication Data

US 2009/0026316 A1    Jan. 29, 2009

(51) Int. Cl.
   *B64C 1/00*    (2006.01)
(52) U.S. Cl. .................. 244/13; 244/172.7; 244/172.8; 244/39; 244/4 R; 180/22; 126/600; 126/573
(58) Field of Classification Search ............. 244/172.7, 244/172.8, 13, 53 R, 39, 4 R, 3.24, 3.3, 3.28, 244/3.29; 126/600, 573; 180/22
   See application file for complete search history.

(56) References Cited

U.S. PATENT DOCUMENTS

| | | | | | |
|---|---|---|---|---|---|
| 3,173,626 | A | * | 3/1965 | Sohn | 244/168 |
| 3,506,220 | A | * | 4/1970 | Sbrilli | 244/19 |
| 4,415,133 | A | * | 11/1983 | Phillips | 244/53 R |
| 6,045,089 | A | * | 4/2000 | Chen | 244/12.1 |
| 6,371,409 | B1 | * | 4/2002 | Steele | 244/30 |
| 6,550,717 | B1 | * | 4/2003 | MacCready et al. | 244/13 |
| 6,742,741 | B1 | * | 6/2004 | Rivoli | 244/12.1 |
| 2003/0075643 | A1 | * | 4/2003 | Dunn | 244/59 |
| 2004/0113020 | A1 | * | 6/2004 | Wang et al. | 244/165 |
| 2004/0140399 | A1 | * | 7/2004 | Liu | 244/164 |
| 2004/0164202 | A1 | * | 8/2004 | Klestadt et al. | 244/3.24 |
| 2005/0127242 | A1 | * | 6/2005 | Rivers, Jr. | 244/137.1 |
| 2006/0091256 | A1 | * | 5/2006 | Palmer | 244/97 |

* cited by examiner

*Primary Examiner*—Michael R Mansen
*Assistant Examiner*—Justin Benedik
(74) *Attorney, Agent, or Firm*—Haynes & Boone, LLP.

(57) ABSTRACT

A solar powered aerial vehicle includes an elongated airframe incorporating lifting and control surfaces, a mechanism for propelling the airframe through the air such that lift developed by the lifting surface is equal to or greater than the weight of the aerial vehicle, a planar solar sail coupled to the airframe and having at least one surface adapted to collect solar energy during the day and to power the propelling mechanism with a first portion of the energy collected, and an apparatus such as a fuel cell/electrolyzer for storing a second portion of the solar energy collected by the solar sail during the day and for powering the propelling mechanism with the second portion of energy during the night. The vehicle is capable of continuous operation at northern latitudes and during the winter months for extended periods without landing or refueling.

16 Claims, 3 Drawing Sheets

SOLAR POWERED AERIAL VEHICLE

BACKGROUND

This disclosure relates to aircraft and aerial vehicles, in general, and in particular, to a solar powered aerial vehicle that is capable of continuous flight at high latitudes during the winter for extended periods without landing or refueling.

During the past 30-40 years, several efforts have been made to develop solar powered aerial vehicles, primarily unmanned, that are capable of achieving flight durations of from several months to years without needing to land or refuel. These vehicles typically employ solar cells located on their exterior surfaces, primarily their wing surfaces, to capture solar energy during the day. They then use some of that energy to fly during the day, and store excess energy in an energy storage device, e.g., a battery, flywheel, fuel cell, or other storage device, to power the vehicle during the dark of night, when the sun is not available for collection of power.

Aerial vehicles that are capable of operating only near the equator or in the long daylight hours of the summer months have only limited operational value. Accordingly, the critical design conditions for solar powered aerial vehicles become the winter months at high latitudes, where the days are relatively short, the sun is relatively low on the horizon, and the nights are relatively long.

Prior solar powered aerial vehicle designs are significantly limited by the vehicle's limited surface areas and surface norms, i.e., the wings typically comprise the largest vehicle surface available for the collection of solar energy, and are typically disposed horizontally relative to the Earth. This arrangement can be disadvantageous, especially in the winter at high latitudes where the angle of the sun is low. Thus, more vertically oriented solar array surfaces are more desirable in wintertime, low-angle sun conditions for maximum solar energy collection. Moreover, the tactic of simply adding more wing, fuselage or tail surface area beyond the minimum needed for the vehicle to fly so as to collect additional solar energy therewith rapidly encounters a point of diminishing returns. This is because the additional surface area results in additional vehicle weight and drag that require more energy to fly than the additional solar energy collected by the added surface area. Higher efficiency and lighter solar cells and energy storage devices could theoretically solve the problem, but the technologies necessary do not exist currently, and are not projected to exist for the next several decades.

Existing solar powered aerial vehicles include the "HELIOS" experimental unmanned aerial vehicle (UAV) developed by AeroVironment and NASA in the 1990's through the early 2000's. The vehicle was an all-wing design that used existing technology solar cells to collect solar energy. HELIOS flew only during the daytime (with limited operation at night using batteries), and never flew a full day-night cycle. The research vehicle was designed to store energy using a fuel cell energy storage system, but that system was never added to the vehicle. Analyses show that aerial vehicles incorporating the HELIOS technology would not be capable of operation at northern latitudes in the winter without solar cell and power storage efficiencies that are not expected to exist for some decades in the future.

The Boeing Company developed a Solar Powered Formation Flight (SPFF) aerial vehicle concept in the mid-1990's in which multiple aerial vehicles would fly in close, drag-reducing formations, thereby significantly reducing drag, and therefore, the power needed to fly. This concept significantly reduced the technology needs of solar cells and power storage, but added the technology and operational constraints of formation flight that some potential users found undesirable. The SPFF vehicles were actually built and flown, but these did not incorporate solar powered propulsion systems.

QinetiQ has recently developed the "Zephyr," a small solar powered aerial vehicle with a conventional wing, body and tail design, which is scheduled to demonstrate high altitude, multi-week "24/7" flight, but in summertime conditions and at only moderate northern latitudes. However, this vehicle lacks the capability of solar powered flight in northern latitudes during the winter months.

Other solar powered aerial vehicles have been developed over the past 20 or more years, but none has a documented capability of long-term operation in the critical conditions of northern latitudes and during the winter.

The prior art vehicles described above vary from a highly efficient, all-wing aerial vehicle (HELIOS), to more aggressive, formation-flight technology (SPFF), as well as other, more conventional wing-body-tail, single aerial vehicle designs. However, without significant increases in solar cell and power storage technologies over what is planned for development in the next several decades, these vehicles all lack the capability of year-round flight at northern latitudes during the winter months, mainly due to a shortage of solar energy collection capability.

A long-felt but as yet unsatisfied need therefore exists for aerial vehicles having vertical surfaces or elevation-tracking surfaces that can be oriented almost vertically in winter conditions and at high latitudes and thereby enable the collection of significantly more solar energy at this critical time of year and latitude condition.

BRIEF SUMMARY

In accordance with the exemplary embodiments disclosed herein, solar powered aerial vehicles are provide that incorporate a novel "tracking solar sail" that enables significantly more solar energy to be collected than that of more convention wind-body-tail or all-wing aerial vehicles, thereby yielding capabilities of virtually indefinite ("24/7") flight durations at northern latitudes during the winter months and significantly exceeding those of previous solar powered aerial vehicles.

In one embodiment, the novel tracking solar sail comprises a non-lift-providing panel located behind the wing and having solar cells located on only one side, which tracks the sun's elevation as the aerial vehicle maneuvers and/or the sun moves across the sky, thereby approximately doubling the amount of solar energy that can be collected in winter months at high latitudes and yielding additional altitude, latitude and/or payload capabilities, as compared to aerial vehicle designs that lack the solar sail.

In another exemplary embodiment, a solar powered aerial vehicle comprises an elongated airframe incorporating lifting and control surfaces, a mechanism for propelling the airframe through the air such that lift developed by the lifting surface is equal to or greater than the weight of the aerial vehicle, a planar solar sail coupled to the airframe and having at least one surface adapted to collect solar energy during the day and to power the propelling mechanism with a first portion of the energy collected, and an apparatus for storing a second portion of the solar energy collected by the solar sail during the day and for powering the propelling mechanism with the stored second portion of energy during the night.

In another exemplary embodiment, an apparatus for increasing the amount of solar power collected by a solar powered aerial vehicle comprises a planar solar sail adapted to be coupled to a fuselage of the vehicle in a plane extending through the roll axis thereof and having at least one surface adapted to collect additional solar energy during the day.

In yet another exemplary embodiment, a method of powering a unmanned solar powered aerial vehicle (USPAV) continuously during the winter months and at high northern latitudes is provided. The method comprises: Coupling a flat panel to a fuselage of the USPAV for rotation about a roll axis thereof, the panel lying in plane passing through the roll axis of the USPAV and having solar cells mounted on one side thereof; rotating the panel about the roll axis of the USPAV such that the side of the panel mounting the solar cells continuously tracks the elevation of the sun during the day and the solar cells collect solar energy therefrom; using a first portion of the energy collected to power the USPAV during the day; storing a second portion of the energy collected; and, using the stored second portion of energy to power the USPAV during the night.

A better understanding of the above and many other features and advantages of the solar powered aerial vehicles of the present invention, together with their many advantageous applications, can be obtained by a consideration of the detailed description of some exemplary embodiments thereof below, particular if such consideration is made in conjunction with the appended drawings, wherein like reference numbers are used refer to like elements in the respective figures thereof.

DETAILED DESCRIPTION

Figure 1:
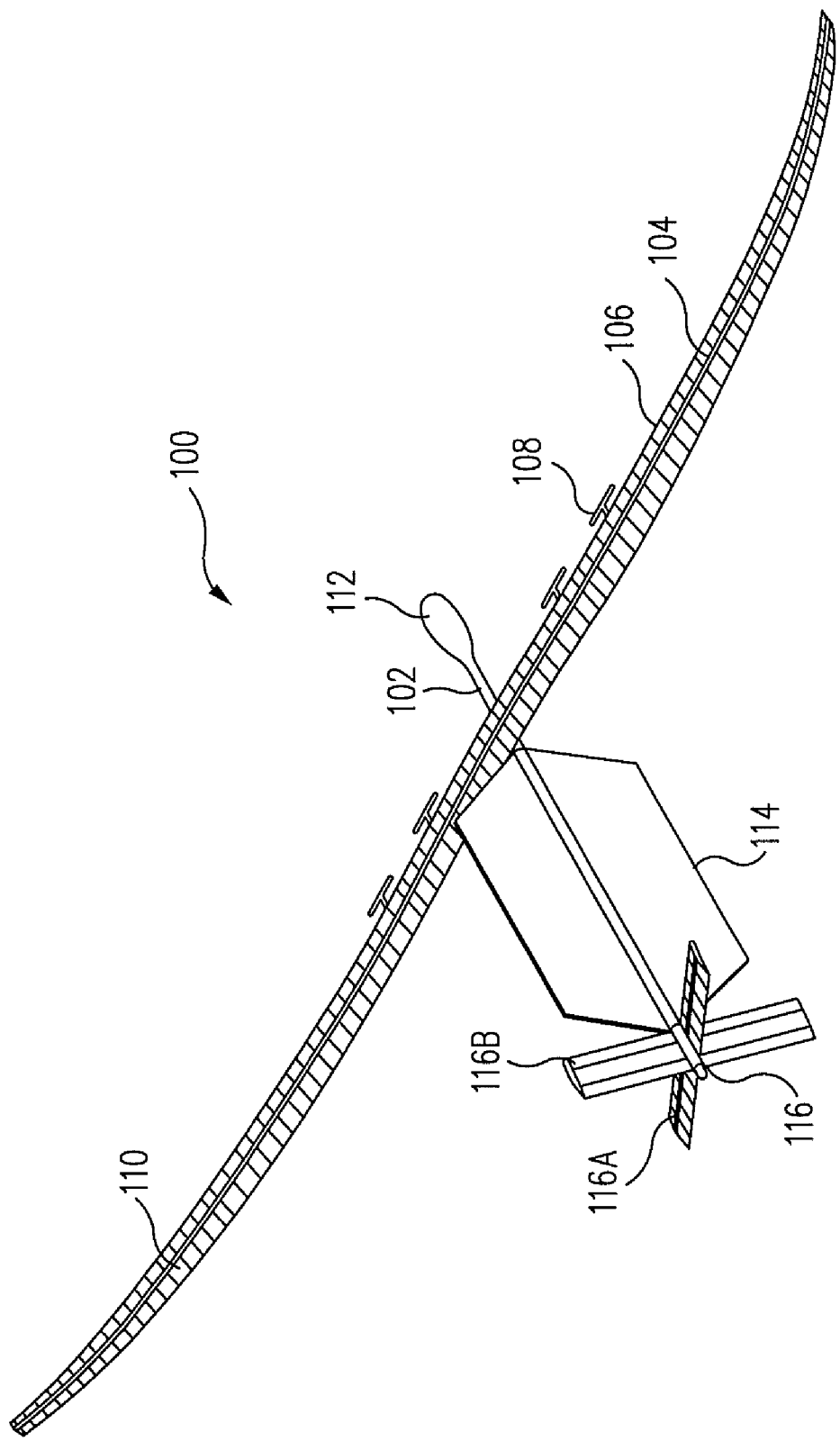
FIG. 1 is a perspective view of an exemplary embodiment of solar powered aerial vehicle in accordance with the present invention, showing the vehicle in flight.

FIG. 1 is a perspective view of an exemplary embodiment of an unmanned solar powered aerial vehicle (USPAV) 100. The vehicle comprises an elongated tubular fuselage 102 and an elongated, relatively narrow (i.e., high-aspect-ratio) wing 104 adapted for efficient, high-altitude, relatively slow flight. The wing mounts a plurality of electric motors 106, each equipped with, e.g., a variable- or fixed-pitch propeller 108, and in one embodiment, may also include an array of solar cells 110 disposed on the upper surface thereof. An enlarged payload and control housing 112 is located at the nose end of the fuselage, and is adapted to carry flight command and control avionics and instrumentation, rechargeable batteries or other energy storage elements, and a payload, such as surveillance cameras, radio or television signal broadcasting or repeating equipment, weather sensors and data recorders, or the like.

Of importance, the exemplary vehicle 100 further includes a tracking solar sail 114 disposed on the fuselage 102 aft of the wing 104, and a solar tracking empennage, or "X-tail" 116 located at the rear end of the fuselage, aft of the solar sail, described in more detail below.

The tracking solar sail 114 comprises a thin, flat, rigid panel located behind the wing 104 of the vehicle, that has solar cells 110 disposed on one side thereof. The panel is disposed in the sagittal plane of the vehicle and adapted to rotate about the long or "roll" axis of the fuselage 102 of the vehicle 100 so as to precisely track the elevation of the sun while the vehicle is flying. The solar sail is preferably capable of rotating through a total angle of at least about 180 degrees, i.e., ±90 degrees relative to the vertical, as the aircraft maneuvers, for example., in a "loiter" mode around a stationary, oval flight path, thereby maintaining the solar energy gathering solar sail oriented in a position that maximizes the solar energy collected by the vehicle during the daytime. This arrangement thus maximizes the solar energy that can be collected in high latitudes in winter months for a given size of panel, resulting in a positive trade of more solar energy collected than is used by the additional weight and drag of the panel.

As those of skill in the art will appreciate, the solar sail 114 is "parasitic" to the flying needs of the aerial vehicle (i.e., it adds both weight and drag, and provides no lift or stabilizing features), and is thus used solely to collect additional solar energy. However, as discussed below, by adapting the solar sail to rotate about the fuselage 102 so as to closely track the sun's elevation, the additional solar energy that can be collected by the sail more than offsets the additional energy that its addition consumes.

In an alternative exemplary embodiment, the solar sail 114 may comprise a vertical panel, i.e., a panel lying in the sagittal plane of the vehicle, having solar cells 110 disposed on both sides thereof, that is fixed to the fuselage 102 of the aerial vehicle 100, thereby enabling the sail to capture more solar energy than aerial vehicles having only upward-facing solar panels or cells on their wings, but this embodiment is not as energy efficient as one having solar cells on only one side, but coupled with a solar elevation tracking mechanism.

An additional feature of the exemplary solar powered aerial vehicle 100 of FIG. 1 comprises the tracking "X-tail" 116 which, like the solar sail 114, has solar cells 110 mounted on only one side thereof, and rotates to track the solar elevation, but which also functions as a control surface to maintain constant pitch and yaw control and stabilizing characteristics required for vehicle flight operation, i.e., as conventional yaw and pitch control surfaces. The X-tail 116 also functions to maximize the solar energy that can be collected on a tail surface during winter months at high latitudes relative to the amount of energy that it consumes in terms of added weight and drag.

The X-tail 116 comprises two laterally extending aerodynamic surfaces 116A and 116B having the same size and disposed perpendicular to each other. When rotated around the roll axis of the vehicle, symmetrical pitch and yaw stability and control functions are maintained. With solar cells disposed on one side of one of the two surfaces, the tail is rotated so that the side mounting the solar cells tracks the sun's elevation, thereby maximizing the amount of solar energy collected, while at the same time providing constant stability and control function to the aerial vehicle 100. Like the solar tracking sail 114, the solar tracking X-tail 116 is preferably capable of rotation about the roll axis of the vehicle through an angle of at least about 180 degrees, i.e., ±90 degrees relative to the vertical.

The major constructional features of the exemplary aerial vehicle 100 thus include the following: 1) The tubular fuselage 102 and housing 112 for the flight, energy storage elements and payload provide an attachment joint for the wing 104 and structure for the rotatable attachments of the sun-tracking solar sail 114 and X-tail 116; 2) The high aspect ratio wing 104 may be built as a single structure with a main tube spar running from wingtip to wingtip, multiple airfoil-shaped ribs, and be covered with a strong, lightweight skin, such as Mylar, to form an airfoil shape for the wing; 3) The multiple electric motors 106 and propellers 108 attached to the leading edge (in a "tractor" configuration), or alternatively, to the trailing edge (in a "pusher" configuration) of the wing provide the thrust necessary to keep the aerial vehicle 100 aloft; 4) The solar sail 114 and X-tail 116 may have a construction similar to that of the wing 102, but additionally, include rotational joints and control motors (not illustrated) that enable each of them to rotate about the tubular fuselage 104 so as to closely track the sun's elevation as the vehicle maneuvers and the sun moves across the sky; 5) The upper surface of the wings 104, and one side of both the solar sail 114 and the X-tail 116, have respective arrays of solar cells 110 that cover over 90% of their respective surface areas to collect solar energy for use in powering the aerial vehicle and its systems; and, 6) The energy storage system (not illustrated) described below that stores excess solar energy collected during the daytime (and is used to power the aerial vehicle during the nighttime) may be housed in the housing 112 at the front end of the aerial vehicle 100.

In one advantageous embodiment, the energy storage device may comprise a Solid Oxide Fuel Cell (SOFC) that provides electrical power from hydrogen gas and air for nighttime power, and also acts as an electrolyzer in the daytime, making hydrogen gas from stored water (captured from the air and used for burning hydrogen at night) using the excess electrical power generated by the solar cells 110 during the day. The fuselage 102 and wing 104 structural tubes may also double as hydrogen gas storage containers.

To date, existing and previous solar powered aerial vehicle designs have been unable to meet operational needs of virtually indefinite duration (24/7) flight at northern latitudes during the winter months, mainly due to an inadequate solar energy collection capability. As discussed above, simply making the wings (or other conventional vehicle surface elements) larger has been shown to be a negative trade and as merely exacerbating the problem. Thus, the provision of the solar elevation tracking solar sail 114 on the aerial vehicle 100 significantly increases the amount of solar energy that can be collected versus its additional energy consumption penalty, thereby enabling an aerial vehicle that can operate at higher latitudes during the winter months, at greater altitudes and/or with heavier payloads. Additionally, the solar elevation tracking X-tail 116 further adds to the solar energy collection capability of the vehicle, further increasing its capability in terms of higher operating latitudes in the winter months, higher altitudes and/or heavier payloads.

Figure 2:
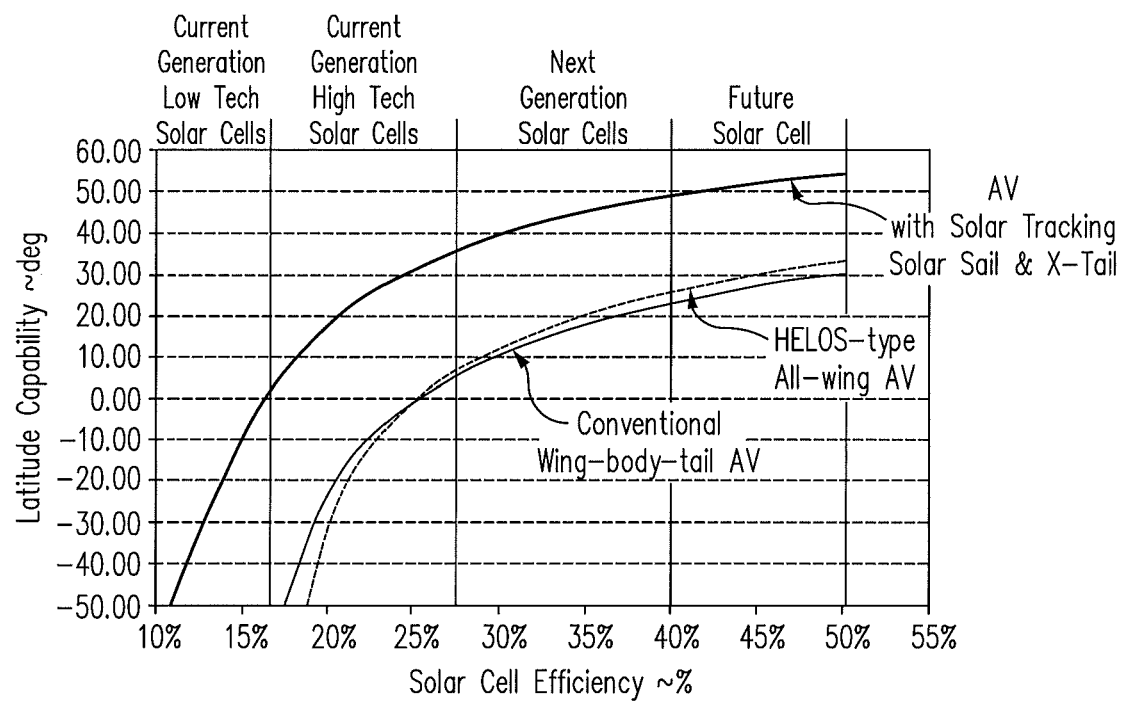
FIG. 2 is a graph illustrating the operational latitude capabilities as a function of solar cell efficiency of the exemplary aerial vehicle of FIG. 1, as compared with those of a conventional wing-body-tail aerial vehicle and an all-wing aerial vehicle.

Thus, even if solar cell and energy storage device efficiencies and weight capabilities are significantly increased to the levels projected in the next several decades, the tracking solar sail 114 and X-tail 116 design still add significantly more latitude, altitude and payload capability over conventional aerial vehicles that lack these features. To verify this, a design trade study was conducted to determine wintertime latitude capabilities versus vehicle design characteristics. The respective performance of the exemplary aerial vehicle 100, as well as those of an "all-wing" and a conventional "wing-body-tail" aerial vehicles, were analyzed for their respective latitude capabilities for various assumed solar cell efficiencies. (It should be noted here that "latitude capability" is the maximum latitude at which the aerial vehicle can collect sufficient excess solar energy during the daytime at a given time of the year to power the vehicle during the nighttime.) FIG. 2 is a graph illustrating the operational latitude capabilities as a function of solar cell efficiency of the exemplary aerial vehicle of FIG. 1, as compared with those of the conventional wing-body-tail aerial vehicle and the all-wing aerial vehicle. The design trade study was performed for aerial vehicles of the same size, each carrying an assumed payload of 400 pounds at an altitude of 65,000 feet. The energy storage device assumed for each of the three vehicles was the same, viz., a next-generation Solid Oxide fuel cell and electrolyzer of the type described above.

As illustrated in FIG. 2, the exemplary solar powered aerial vehicle 100 has a substantial 25 degrees of additional latitude capability in the winter months, compared with the other two prior art USPAV designs. With current-generation "high tech" solar cells, the conventional and all-wing aerial vehicles have only summertime latitude (negative latitudes in the winter) capability (i.e., 0 to −50 degrees). And, even if equipped with next-generation solar cells (i.e., solar cells projected to be developed in the next 5 to 10 years) the two vehicles have only low northern latitude capability (0 to 25 deg) during the winter months.

By contrast, the exemplary aerial vehicle 100 equipped with a solar elevation tracking solar sail 114 and X-tail 116 has a low to medium northern latitude capability (0 to 35 degrees) in the winter with current-generation high tech solar cells, and when equipped with the projected next-generation solar cells, an increased winter months high latitude capability of from 35 to 50 degrees.

Figure 3A:
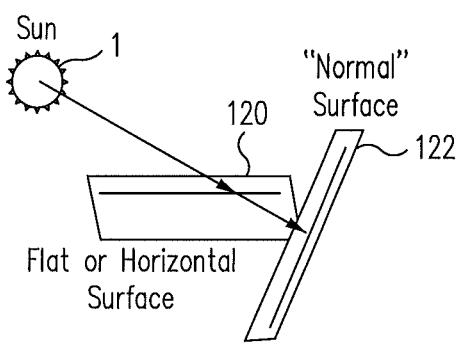
FIGS. 3A and 3B are a perspective view of the rays of the sun incident on a horizontally disposed surface and a surface oriented normal to the rays, and a graph showing the elevation of the sun and the percent of energy respectively incident on those two surfaces as a function of northern latitude at the winter solstice.

The ability to collect solar energy with a solar cell is proportional to the angle of the cell relative to solar elevation angle, which varies with latitude and time-of-year. FIG. 3A is a perspective view of the rays of the sun 1 incident on a horizontally disposed surface 120 and a surface 122 that is oriented normal, i.e., perpendicular, to the rays during, e.g., the winter solstice (December 21 in the Northern Hemisphere), at which time the day is the shortest and the night is the longest of the year. FIG. 3 B is a graph showing the elevation of the sun 1 and the percent of energy respectively incident on the two surfaces 120 and 122 as a function of their northern latitudinal location at the winter solstice.

Figure 3B:
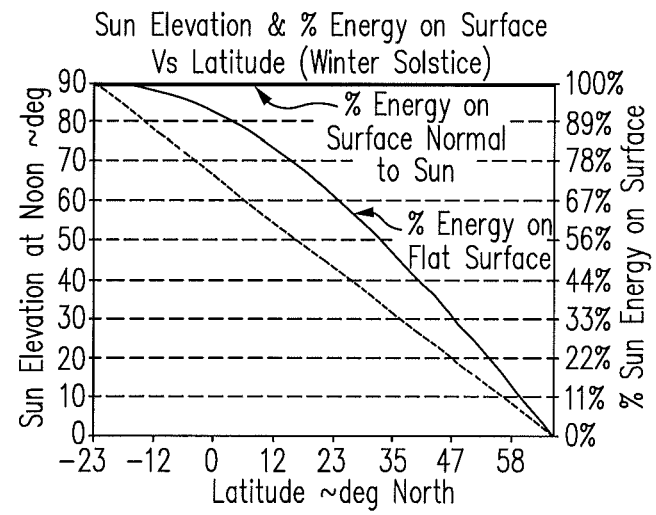

As may be seen in FIG. 3B, the sun 1 elevation is directly overhead (i.e., 90 degrees) in the southern hemisphere at 23.3 degrees (−23.3 degrees north) latitude at noon. The solar elevation varies linearly with latitude, approaching zero at 66.6 degrees north. The percent of energy that can be collected by solar cells is relative to the angle at which they are disposed with respect to the rays of the sun 1. The collected energy percentage varies with the sine of the relative angle between them. Thus, when the sun is directly overhead (−23.3 degrees latitude), 100 percent of the available solar energy is directly incident on the solar cells of the horizontally disposed panel 122.

Then, as the latitude increases, the solar elevation angle decreases, and the percentage of the available solar energy that is directly incident upon the solar cell varies directly with the sine of the relative angle, to zero at 66.6 degrees latitude. At latitudes around 45 degrees north, only about a ⅓ of the relative solar energy impinges directly on the solar cells on horizontally disposed panels. However, if the surface upon which the solar cells is mounted is rotated so as to be normal, or perpendicular, to the sun's rays, then 100 percent of the solar energy directly impinges on the solar cell, regardless of the latitude or the elevation of the sun. Additionally, as the sun rises and sets, the solar elevation angle moves from zero to its noontime elevation, then back to zero. This further reduces the solar elevation angle, and hence, the amount of solar energy that can be collected on a fixed, horizontal solar cell panel. However, an "elevation tracking" panel continues to collect nearly 100 percent of the incident solar energy during all of the daylight hours.

Thus, the "solar sail" 114 of the aerial vehicle 100, i.e., a solar elevation tracking panel with solar cells 110 that are continually oriented normal to the sun's elevation angle, will collect a maximum of energy relative to a solar cell panel that is fixed horizontally, e.g., solar panels mounted on wing upper surfaces.

Figure 4:
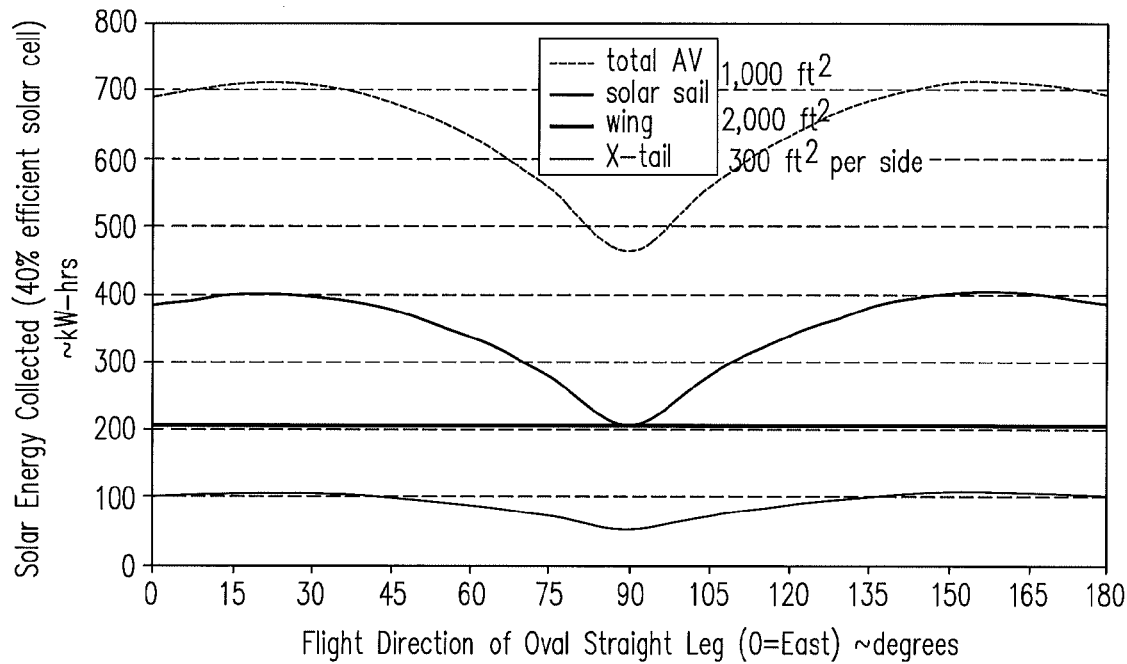
FIG. 4 is a graph of the solar energy collected by the respective components of the exemplary aerial vehicle while flying a closed oval course at a latitude of 45 degrees north, at the winter solstice, as a function of the vehicle's true heading during the long legs of the course; and, FIG. 5 is a schematic perspective view of the oval course flown by the exemplary aerial vehicle in deriving the graph of FIG. 4.

FIG. 4 is a graph of the solar energy collected by the respective energy gathering components of the exemplary aerial vehicle 100 while flying a closed oval course 124 (see FIG. 5) at a latitude of 45 degrees north, at the winter solstice, as a function of the vehicle's true heading during the two long legs 128 of the course. The wing 104 is assumed to have an area of 2,000 square feet and is disposed horizontally when flying level, and to have solar cells 110 located on only the upper surface thereof. The X-tail 116 comprises an area of 300 square feet (per side), and the solar sail 114 comprises 1,000 square feet. Each has solar cells 110 disposed over 90 percent of only on one side of its respective solar cell mounting surface, and each is arranged to rotate so as to maintain its respective energy collecting side normal to the sun's elevation angle, thereby maximizing its respective solar energy collection capability.

Figure 5:
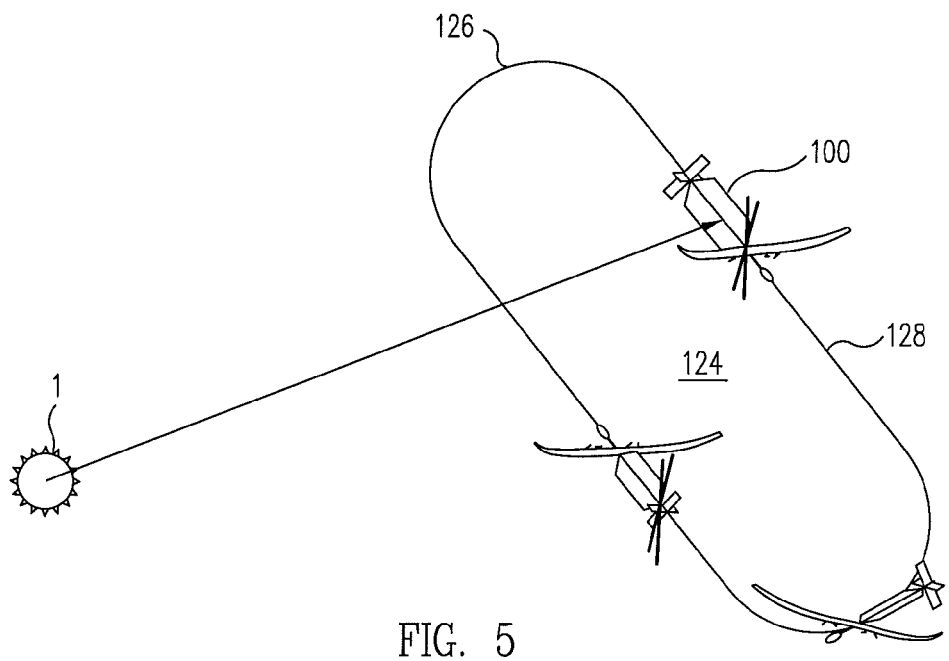

FIG. 4 illustrates the solar energy collected on each of the above energy collecting surface of the vehicle 100, as well as the total energy collected, over a 24 hour period, when flying a closed oval flight course 124 having one-mile diameter ends 126 and 10 mile straight legs 128, such as that illustrated in FIG. 5. As may be seen in FIG. 4, the plot of the energy collected varies with the true heading of the straight legs 128 of the oval flight course 124. A heading of approximately 15 degrees north of due east collects the maximum energy at the winter solstice and a latitude of 45 degrees north. FIG. 4 thus illustrates the value of the solar sail 114 in collecting significantly more energy that the wing 104, even though its size is only half that of the wing. Without the solar sail 114, the aerial vehicle 100 would not be capable of collecting a sufficient amount of energy to fly through the entire night.

FIG. 5 is a schematic perspective view of the closed, fixed oval course 124 assumed flown by the exemplary aerial vehicle 100 in developing the graph of FIG. 4. As illustrated in FIG. 5, the solar sail 114 and X-tail 116 both rotate to track the solar elevation angle so as to maximize the solar energy collected, and it may be further noted that the solar sail and X-tail tracking angles change continuously with the time of day, as well as with the heading of the vehicle.

The exemplary USPAV 100 having year-round operational capabilities at mid to high latitudes may be used by many organizations, both governmental and private, for a wide variety of missions. Potential applications are as communication relays, border or harbor surveillance platforms, high-speed data relays, and many others.

As those of skill in this art will by now appreciate, many modifications, substitutions and variations can be made in the materials, methods and implementations of the solar powered aerial vehicles of the present invention without departing from its spirit and scope. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. A solar powered aerial vehicle, comprising:
an elongated airframe having a roll axis and incorporating lifting and control surfaces;
a mechanism for propelling the airframe through the air such that lift developed by the lifting surface is equal to or greater than the weight of the vehicle;
a planar solar panel rotatably coupled to the airframe and lying in a plane passing through the roll axis thereof, the panel having solar cells mounted on one side and being arranged to rotate about the roll axis and relative to the airframe while maintaining the lifting surface constantly horizontal such that the side of the panel mounting the solar cells continuously tracks the elevation of the sun during the day while the vehicle remains disposed in level flight so as to collect solar energy during the day and to power the propelling mechanism with a first portion of the energy collected;
an X-tail having two laterally extending surfaces disposed perpendicular to each other and coupled to an aft end of the airframe, one of the two surfaces having solar cells mounted on one side thereof; and,
an apparatus for storing a second portion of the solar energy collected by the solar panel and the X-tail during the day and for powering the propelling mechanism with the stored second portion of energy during the night.

2. The aerial vehicle of claim 1, wherein the solar panel is arranged to rotate through an angle of at least about 180 degrees.

3. The aerial vehicle of claim 1, wherein the X-tail is arranged to rotate about the roll axis of the airframe such that the side of the one surface mounting the solar cells continuously tracks the elevation of the sun during the day while the vehicle remains disposed in level flight, and such that the X-tail provides yaw and pitch control and stability to the aerial vehicle during flight.

4. The aerial vehicle of claim 3, wherein the X-tail is arranged to rotate through an angle of at least about 180 degrees.

5. The aerial vehicle of claim 1, wherein the lifting surface comprises a high aspect ratio wing having solar cells mounted on an upper surface thereof.

6. The aerial vehicle of claim 1, wherein the energy storage apparatus comprises a rechargeable battery or a Solid Oxide Fuel Cell (SOFC) and electrolyzer.

7. The aerial vehicle of claim 1, further comprising a payload and control housing disposed at a nose end of the airframe.

8. The aerial vehicle of claim 1, wherein the vehicle comprises an unmanned aerial vehicle (UAV).

9. An apparatus for increasing the amount of solar power collected by a solar powered aerial vehicle, comprising:
a planar solar panel adapted to be coupled to a fuselage of the vehicle in a plane extending through the roll axis thereof, the solar panel having solar cells mounted on one side thereof and being arranged to rotate about the roll axis and relative to the vehicle such that the side of the panel mounting the solar cells continuously tracks the elevation of the sun during the day while the vehicle remains disposed in level flight; and,
an X-tail having two laterally extending aerodynamic surfaces disposed perpendicular to each other and rotatably coupled to an aft end of the fuselage, one of the two surfaces having a solar cell mounted on one side thereof.

10. The apparatus of claim 9, wherein the solar panel is capable of rotating through an angle of at least about 180 degrees.

11. The apparatus of claim 9, wherein the X-tail is arranged to rotate about the roll axis of the vehicle such that the side of the one surface mounting the solar cell continuously tracks the elevation of the sun during the day while the vehicle remains disposed in level flight.

12. The apparatus of claim 11, wherein the X-tail is capable of rotating through an angle of at least about 180 degrees.

13. A method of powering an unmanned solar powered aerial vehicle (USPAY) continuously at high latitudes and during the winter months, the method comprising:
  coupling a flat panel to a fuselage of the USPAY for rotation about a roll axis thereof, the panel lying in plane passing through the roll axis of the USPAY and having solar cells mounted on one side thereof;
  rotating the panel about the roll axis of the USPAY while the USPAY remains disposed in level flight such that the side of the panel mounting the solar cells continuously tracks the elevation of the sun during the day and the solar cells collect solar energy therefrom;
  using a first portion of the energy collected to power the USPAY during the day;
  storing a second portion of the energy collected; and,
  using the stored second portion of energy to power the USPAY during the night.

14. The method of claim 13, further comprising:
  coupling two perpendicular, laterally extending aerodynamic surfaces to a tail end of the fuselage for rotation about the roll axis thereof, one of the two surfaces having solar cells mounted on one side thereof;
  rotating the two surfaces about a roll axis of the vehicle while the USPAY remains disposed in level flight such that the side of the one surface mounting the solar cells continuously tracks the elevation of the sun during the day and the solar cells collect solar energy therefrom
  using a first portion of the energy collected to power the USPAY during the day;
  storing a second portion of the energy collected;
  using the stored second portion of energy to power the USPAY during the night, and,
  controlling the pitch and yaw of the USPAY with the two surfaces.

15. The method of claim 14, wherein storing a second portion of the energy collected comprises making hydrogen in an electrolyzer.

16. The method of claim 15, wherein using the stored second portion of energy comprises generating electricity from the hydrogen and air in a fuel cell.

* * * * *